United States Patent [19]
Yasukuni

[11] Patent Number: 5,635,678
[45] Date of Patent: Jun. 3, 1997

[54] CONSTRUCTION FOR AND METHOD OF WATERPROOFING WIRING HARNESS

[75] Inventor: Jun Yasukuni, Yokkaichi, Japan

[73] Assignee: Sumitomo Wiring Systems, Ltd., Yokkaichi, Japan

[21] Appl. No.: 246,158

[22] Filed: May 19, 1994

[30] Foreign Application Priority Data

Jun. 8, 1993 [JP] Japan .................. 5-137458

[51] Int. Cl.$^6$ .......................................... H02G 3/04
[52] U.S. Cl. ........................ 174/152 G; 174/153 G; 29/868; 156/48; 248/56; 264/DIG. 80; 425/129.1
[58] Field of Search ................ 174/153 G, 151, 174/152 G, 50.59, 65 G, 65 SS, 65 R; 16/2; 29/825, 868, 872; 248/56; 264/272.14, DIG. 80, 138, 279; 425/127, 129.1; 156/48, 51; 52/220.8

[56] References Cited

U.S. PATENT DOCUMENTS

| | | | |
|---|---|---|---|
| 4,607,469 | 8/1986 | Harrison | 52/220.8 |
| 4,694,907 | 9/1987 | Stahl et al. | 166/303 |
| 4,797,513 | 1/1989 | Ono et al. | 174/153 G |
| 5,270,487 | 12/1993 | Sawamura | 174/65 G X |

FOREIGN PATENT DOCUMENTS

| | | |
|---|---|---|
| 0178193 | 4/1986 | European Pat. Off. . |
| 2671916 | 7/1992 | France . |
| 1-66713 | 4/1989 | Japan . |
| 1220313 | 9/1989 | Japan . |
| 2115221 | 9/1990 | Japan . |
| 4-23812 | 2/1992 | Japan . |

*Primary Examiner*—Kristine L. Kincaid
*Assistant Examiner*—Paramita Ghosh
*Attorney, Agent, or Firm*—Greenblum & Bernstein, P.L.C.

[57] ABSTRACT

A construction for and a method of waterproofing a group of wires of a wiring harness inserted through a tubular member, the construction including: a tube which has a closed distal end portion and an open rear end and is formed, in the vicinity of the closed distal end portion, with a number of pores; the tube being disposed at a substantially central portion of the wires of the wiring harness; and pourable sealing compound which is injected into the tube from the open rear end and is extruded from the pores of the closed distal end portion so as to be filled into gaps among the wires of the wiring harness.

12 Claims, 3 Drawing Sheets

CONSTRUCTION FOR AND METHOD OF WATERPROOFING WIRING HARNESS

BACKGROUND OF THE INVENTION

The present invention relates to a construction for and a method of waterproofing a wiring harness inserted through a tubular member such as a grommet.

In a motor vehicle, when a wiring harness is provided so as to pass through a panel separating an engine room and a cabin from each other, a grommet made of rubber is fitted into a through-hole formed on the panel and the wiring harness is inserted through the grommet such that penetration of water into the cabin is prevented.

The grommet is of substantially a shape of a frustum of cone and has a large diameter portion and a tubular portion extending from a reduced diameter end of the large diameter portion. Meanwhile, a panel mounting portion is provided on an outer peripheral surface of the large diameter portion of the grommet so as to be brought into engagement with an inner peripheral edge of the through-hole of the panel. A gap between the grommet and the through-hole of the panel is sealed positively so as to be waterproofed. Thus, the wiring harness is inserted from the tubular portion into the large diameter portion so as to be passed through the grommet.

If gaps exist among wires of the wiring harness passed through the grommet and between each of the wires and the tubular portion of the grommet, water may penetrate from the engine room into the cabin through these gaps. Therefore, these gaps are also required to be sealed.

Various waterproof constructions for sealing these gaps are known. For example, Japanese Utility Model Laid-Open Publication Nos. 1-66713 (1989) and 2-115221 (1990) disclose an arrangement in which pourable sealing compound is filled into the grommet from the large diameter portion so as to be penetrated into the gaps. Meanwhile, Japanese Utility Model Laid-Open Publication No. 4-23812 (1992) discloses an arrangement in which by employing an elastic cap having a plurality of holes for inserting the wires of the wiring harness therethrough, respectively, the elastic cap is fitted, in a state where the wires of the wiring harness have been, respectively, inserted through the holes of the elastic cap, into the tubular portion of the grommet and then, pourable sealing compound is filled from the large diameter portion up to inside of the elastic cap.

However, in the former known waterproof construction referred to above, unless the pourable sealing compound has a low viscosity of, for example, not more than 100 poise, the pourable sealing compound is less likely to penetrate into gaps among the wires. On the other hand, if viscosity of the pourable sealing compound is low, the pourable sealing compound may flow out of the gaps among the wires before being set. Therefore, in this known arrangement, it is impossible to perform complete waterproofing.

Meanwhile, in the latter known waterproof construction referred to above, gaps are positively formed among the wires. Thus, even if the pourable sealing compound has high viscosity, the pourable sealing compound readily penetrates into the gaps among the wires and thus, it is possible to perform complete waterproofing. However, in this known waterproof construction, the elastic cap is required to be provided additionally and its manufacture is troublesome due to addition of a step of inserting the wires through the holes of the elastic cap and a step of fitting the elastic cap into the grommet, thereby resulting in rise of its manufacturing cost. Furthermore, such a problem arises that diameter of the large diameter portion of the grommet is increased by the gaps among the wires, thus resulting in increase of size of the grommet.

SUMMARY OF THE INVENTION

Accordingly, an essential object of the present invention is to provide, with a view to eliminating the above mentioned drawbacks of prior art, a construction for and a method of waterproofing a wiring harness, which enable complete waterproofing through relatively simple manufacturing steps at low cost.

In order to accomplish this object of the present invention, a waterproof construction for a group of wires of a wiring harness inserted through a tubular member, according to the present invention comprises: a tube which has a closed distal end portion and an open rear end and is formed, in the vicinity of the closed distal end portion, with a number of pores; the tube being disposed at a substantially central portion of the wires of the wiring harness; and pourable sealing compound which is injected into the tube from the open rear end and is extruded from the pores of the closed distal end portion so as to be filled into gaps among the wires of the wiring harness.

In case the tubular member is a grommet having a large diameter portion mounted on a panel and a tubular portion extending from a reduced diameter end of the large diameter portion such that the pourable sealing compound filled into the gaps among the wires of the wiring harness is disposed in an area of the grommet ranging from the tubular portion to the reduced diameter end.

Furthermore, the present invention is directed to a method of waterproofing a group of wires of a wiring harness inserted through a grommet having a large diameter portion mounted on a panel and a tubular portion extending from a reduced diameter end of the large diameter portion, comprising the steps of: setting at a substantially central portion of the wires of the wiring harness a tube which has a closed distal end portion and an open rear end and is formed, in the vicinity of the closed distal end portion, with a number of pores; inserting the wiring harness from the large diameter portion of the grommet into the tubular portion through the reduced diameter end so as to dispose the closed distal end portion of the tube at the tubular portion of the grommet; and injecting pourable sealing compound into the tube from the open rear end so as to extrude the pourable sealing compound from the pores such that the pourable sealing compound is filled into gaps among the wires of the wiring harness.

More specifically, the tube is of small diameter and is flexible and is set at a substantially central portion of the wires of the wiring harness in advance. Then, the wiring harness is inserted from the large diameter portion of the grommet into the tubular portion through the reduced diameter end. At this time, the closed distal end portion of the tube is disposed axially outwardly of a distal end of the tubular portion of the grommet, while the closed rear end of the tube is projected out of a protective tape wound around an outer periphery of the wires and is disposed axially outwardly of the large diameter portion of the grommet. After the grommet and the wiring harness have been fixed to each other by a tape in this state, the pourable sealing compound is injected into the tube from the open rear end by using a dispenser so as to be extruded from the pores of the closed distal end portion of the tube.

When the pourable sealing compound is injected into the tube from the open rear end by setting the closed distal end portion of the tube at a substantially central portion of the wiring harness, the pourable sealing compound is extruded from the pores of the distal end portion of the tube so as to be filled into the gaps among the wires of the wiring harness such that an outer peripheral surface of the wiring harness is brought into close contact with an inner peripheral surface of the tubular member or the tubular portion of the grommet.

Pressure of the dispenser can be utilized for injecting the pourable sealing compound into the tube. Therefore, even if the pourable sealing compound has high viscosity, the pourable sealing compound is smoothly penetrated into the gaps among the wires of the wiring harness, thereby resulting in complete waterproofing of the wires. Meanwhile, since filling step of the pourable sealing compound is performed by merely injecting the pourable sealing compound into the tube, the filling step of the pourable sealing compound can be applied to a mass production line and is relatively simple. Furthermore, since additionally required materials are only the tube and the pourable sealing compound, rise of manufacturing cost can be minimized. In addition, since the pourable sealing compound can be filled into the tubular portion allowing small displacement of the pourable sealing compound in the grommet, displacement of the pourable sealing compound due to external force such as bending, folding, vibrations, etc. is small. Hence, separation of the pourable sealing compound from the wires is least likely to take place and thus, deterioration of waterproofing property of the waterproof construction is lessened.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
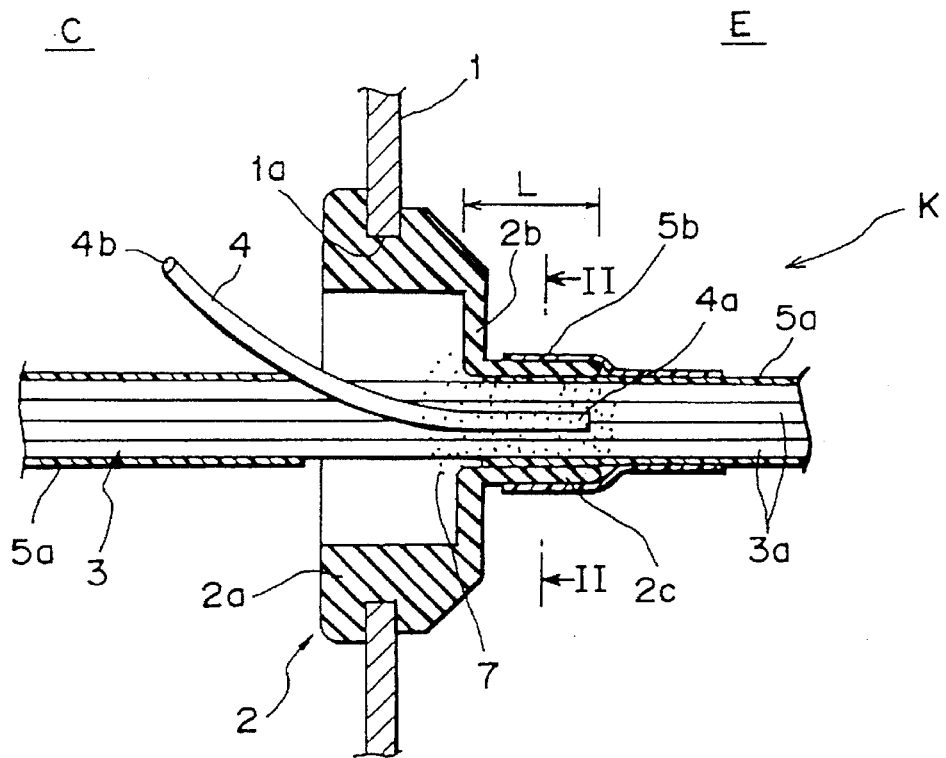
FIG. 1 is a sectional view of a waterproof construction for a wiring harness inserted through a grommet, according to the present invention.

Referring now to the drawings, there is shown in FIG. 1, a waterproof construction K for a wiring harness 3 inserted through a grommet 2, according to one embodiment of the present invention. In the waterproof construction K, the grommet 2 is made of rubber and has a large diameter portion 2a and a tubular portion 2c extending from a reduced diameter end 2b of the large diameter portion 2a, while an engine room E and a cabin C of a motor vehicle are separated from each other by a panel 1 having a through-hole 1a. The large diameter portion 2a of the grommet 2 is fitted into the through-hole 1a of the panel 1 so as to be brought into engagement with the through-hole 1a. The wiring harness 3 is inserted from the tubular portion 2c of the grommet 2 into the large diameter portion 2a so as to be passed through the grommet 2. The wiring harness 3 is formed by a bundle of a number of wires 3a.

Figure 3:
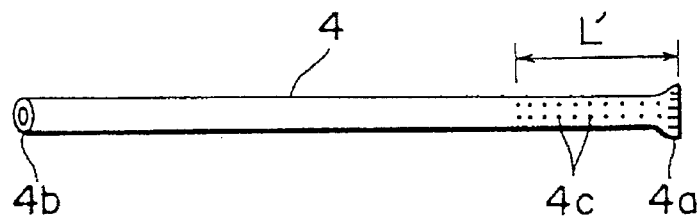
FIG. 3 is a perspective view of a tube employed in the waterproof construction of FIG. 1.
Figure 4:
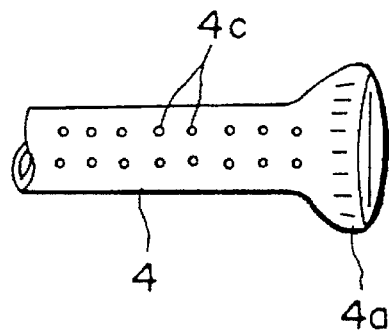
FIG. 4 is an enlarged fragmentary perspective view of the tube of FIG. 3.
Figure 5:
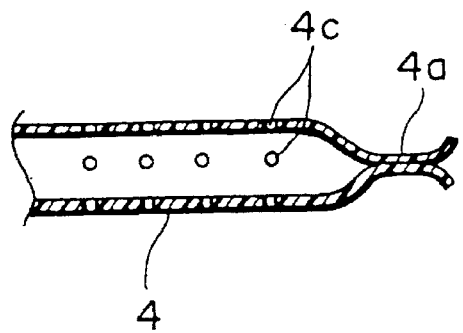
FIG. 5 is a longitudinal sectional view of the tube of FIG. 4.

Meanwhile, as shown in FIGS. 3 to 5, the waterproof construction K further includes a tube 4 made of flexible synthetic resin, for example, vinyl chloride or polyethylene. It is preferable that the tube 4 has an inside diameter of 2 mm and an outside diameter of 3 mm approximately. A distal end portion 4a of the tube 4 is closed by fusion bonding it or screwing a plug thereinto. In the vicinity of the distal end portion 4a of the tube 4, a number of pores 4c are formed on a wall of the tube 4 over a length L' from the distal end portion 4a, which is slightly larger than a length L of the tubular portion 2c of the grommet 2.

Figure 2:
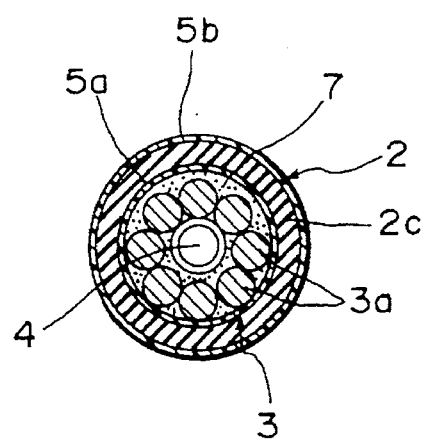
FIG. 2 is an enlarged sectional view taken along the line II—II in FIG. 1.
Figure 6:
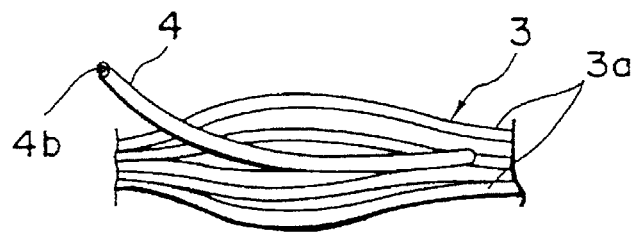
FIG. 6 ms a perspective view of a wiring harness provided with the tube of FIG. 3.
Figure 7:
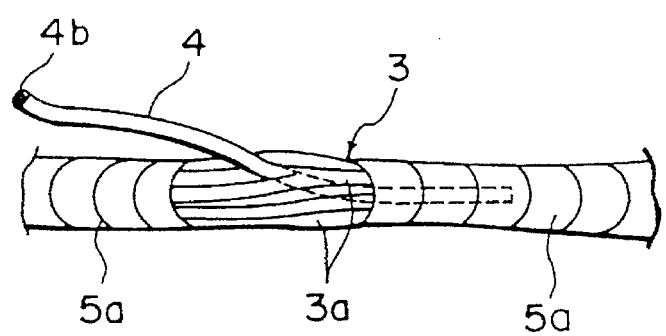
FIG. 7 is a perspective view of the wiring harness of FIG. 6, around which an adhesive tape is wound.

When the wiring harness 3 is assembled as shown in FIG. 6, a number of the wires 3a are bundled together with the tube 4 by disposing the distal end portion 4a of the tube 4 at a substantially central portion of the wires 3a as shown in FIG. 2. Subsequently, except for a lead-out portion of the wiring harness 3 out of which an open rear end 4b of the tube 4 is taken, adhesive tapes 5a are wound around opposite sides of the lead-out portion of the wiring harness 3, respectively as shown in FIG. 7. As a result, the wires 3a and the tube 4 are bundled together so as to be fixed in position. At this time, a rear portion of the pores 4c is not covered by the adhesive tape 5a so as to be exposed outwardly.

Figure 8:
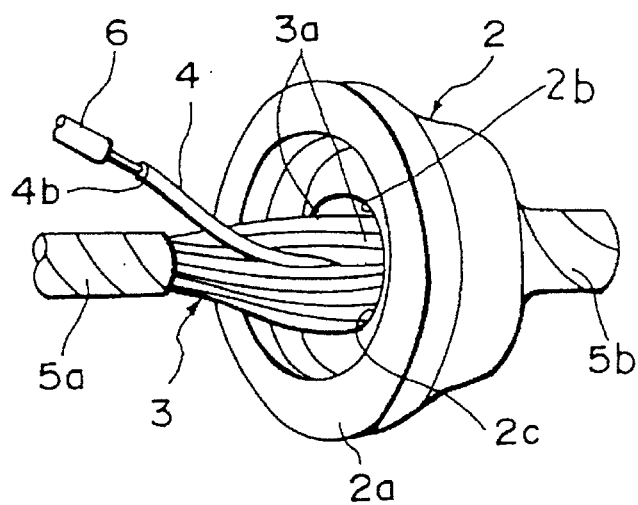
FIG. 8 is a perspective view in which the wiring harness of FIG. 6 is inserted through the grommet of FIG. 1.

Thereafter, as shown in FIG. 8, the wiring harness 3 is inserted from the large diameter portion 2a into the tubular portion 2c via the reduced diameter end 2b so as to be passed through the grommet 2. Thus, the distal end portion 4a of the tube 4 is axially disposed adjacent to a distal end of the tubular portion 2c of the grommet 2 and the rear portion of the pores 4c, which is not covered by the adhesive tape 5a so as to be exposed outwardly, is disposed in the large diameter portion 2a and in the vicinity of the reduced diameter end 2b. Furthermore, the open rear end 4b of the tube 4 is disposed axially outwardly of the large diameter portion 2a of the grommet 2. In this state, an adhesive tape 5b is wound around the tubular portion 2c of the grommet 2 and the wiring harness 3 as shown in FIG. 1 so as to secure the grommet 2 to the wiring harness 3.

After the grommet 2 has been secured to the wiring harness 3 by the adhesive tape 5b as described above, a dispenser 6 for injecting pourable sealing compound 7 is attached to the open rear end 4b of the tube 4. When the pourable sealing compound 7 of high viscosity is injected into the tube 4 by utilizing pressure of the dispenser 6, the pourable sealing compound 7 is passed through the tube 4 so as to be extruded from the pores 4c disposed adjacent to the distal end portion 4a of the tube 4 as shown in FIGS. 1 and 2. As a result, the pourable sealing compound 7 is filled into gaps among the wires 3a of the wiring harness 3 and also a gap between the wires 3a and an inner periphery of the large diameter portion 2a in the vicinity of the reduced diameter end 2b.

Upon completion of filling of the pourable sealing compound 7, the tube 4 may be attached to the wires 3a by using an adhesive tape. Alternatively, a portion of the tube 4 projecting out of an outside diameter of the wiring harness 3 may be cut off such that the remaining portion of the tube 4 is fixed to the wires 3a by using an adhesive tape.

The pourable sealing compound 7 is injected into the tube 4 by utilizing pressure of the dispenser 6. Hence, even if the pourable sealing compound 7 has high viscosity, the pourable sealing compound 7 can be smoothly penetrated into gaps among the wires 3a. Meanwhile, since the pourable sealing compound 7 is injected into the wiring harness 3 through the tube 4 disposed at a substantially central portion of the wiring harness 3, the pourable sealing compound 7 can be filled into gaps among the wires 3a at the thin tubular portion 2c of the grommet 2. Furthermore, by injecting the pourable sealing compound 7 at high pressure, the adhesive tape 5a wound around the outer periphery of the wiring harness 3 can be expanded so as to be brought into close contact with an inner periphery of the tubular portion 2c of the grommet 2.

Thus, since the pourable sealing compound 7 is filled into gaps among the wires 3a at the tubular portion 2c of the grommet 2, waterproofing can be performed sufficiently. In addition, since the adhesive tape 5a wound around the outer periphery of the wiring harness 3 is brought into close contact with the inner periphery of the tubular portion 2c of the grommet 2, waterproofing is enhanced.

Meanwhile, in the vicinity of the reduced diameter portion 2b of the grommet 2, the pourable sealing compound 7 is filled into gaps among the wires 3a as well as a gap between the wires 3a and the inner periphery of the grommet 2, thereby resulting in complete waterproofing.

Viscosity of the pourable sealing compound 7 is selected such that there is no risk that the pourable sealing compound 7 oozes out of the gaps. For example, the pourable sealing compound 7 properly has a viscosity of 200 to 500 poise.

Meanwhile, since filling step of the pourable sealing compound 7 is performed by merely injecting the pourable sealing compound 7 into the tube 4, the filling step of the pourable sealing compound 7 can be applied to a mass production line and is relatively simple. Furthermore, since additionally required materials are only the tube 4 of several cm in length and the pourable sealing compound 7, rise of manufacturing cost is also minimized.

Moreover, since the pourable sealing compound 7 can be filled into not the large diameter portion 2a allowing large displacement of the pourable sealing compound 7 in the grommet 2 but the tubular portion 2c allowing small displacement of the pourable sealing compound 7 in the grommet 2 as described above, displacement of the pourable sealing compound 7 due to external force such as bending, folding, vibrations, etc. is small. Thus, separation of the pourable sealing compound 7 from the wires is least likely to take place and thus, deterioration of waterproofing property of the waterproof construction is lessened.

The above mentioned embodiment is directed to the waterproof construction of the wiring harness 3 relative to the grommet 2. However, it is needless to say that the present invention can also be applied to other waterproof tubular members than the grommet, for example, a waterproof sleeve.

As is clear from the foregoing description of the waterproof construction of the present invention, the pourable sealing compound is injected from the rear end portion of the tube by disposing the distal end portion of the tube in the wiring harness and is extruded from the pores disposed at the distal end portion of the tube so as to be filled into the gaps among the wires of the wiring harness and the gap between the wires and the tubular portion of the tubular member.

Therefore, pressure of the dispenser can be utilized when the pourable sealing compound is injected into the tube. Thus, even if the pourable sealing compound has high viscosity, the pourable sealing compound can be smoothly penetrated into the gaps, thereby resulting in complete waterproofing. Meanwhile, since filling step of the pourable sealing compound is performed by merely injecting the pourable sealing compound into the tube, the filling step of the pourable sealing compound can be applied to a mass production line and is relatively simple. In addition, additionally required materials are only the tube and the pourable sealing compound, rise of manufacturing cost is minimized.

Furthermore, in case the tubular member is the grommet, the pourable sealing compound can be filled into the small diameter portion allowing small displacement of the pourable sealing compound in the grommet, displacement of the pourable sealing compound due to external force such as bending, folding, vibrations, etc. is small, so that separation of the pourable sealing compound from the wires is least likely to take place and thus, deterioration of waterproofing property of the waterproof construction is lessened.

What is claimed is:

1. A waterproof construction for a group of wires of a wiring harness adapted for insertion through a tubular member, comprising:

a tube which has a closed distal end portion and an open rear end and is formed, in the vicinity of the closed distal end portion with a number of pores;

the tube being disposed at a substantially central portion of, and substantially coaxially with, the wires of the wiring harness; and pourable sealing compound which is injected into the tube from the open rear end and is extruded from the pores of the closed distal end portion so as to be filled into gaps among the wires of the wiring harness.

2. A waterproof construction as claimed in claim 1, said waterproof construction including the tubular member, wherein the tubular member is a grommet having a large diameter portion mounted on a panel and a tubular portion extending from a reduced diameter end of the large diameter portion such that the pourable sealing compound filled into the gaps among the wires of the wiring harness is disposed in an area of the grommet ranging from the tubular portion to the reduced diameter end of the large diameter portion.

3. A waterproof construction according to claim 1, wherein said distal end portion of said tube is attached to said wiring harness.

4. A method of waterproofing a group of wires of a wiring harness inserted through a grommet having a large diameter portion mounted on a panel and a tubular portion extending from a reduced diameter end of the large diameter portion, comprising the steps of:

setting at a substantially central portion of the wires of the wiring harness a tube which has a closed distal end portion and an open rear end and is formed, in the vicinity of the closed distal end portion, with a number of pores;

inserting the wiring harness from the large diameter portion through the reduced diameter end so as to disposed the closed distal end portion of the tube at the tubular portion of the grommet;

injecting pourable sealing compound from a source of sealing compound into the tube from the open rear end so as to extrude the pourable sealing compound from the pores such that the pourable sealing compound is filled into gaps among the wires of the wiring harness; and removing the source of sealing compound from the tube.

5. A method of waterproofing according to claim 4, wherein said the step of injecting is followed by a step of attaching said open rear end portion of said tube to said wiring harness.

6. A method of waterproofing according to claim 4, wherein said step of injecting is followed by a step of cutting said open rear end portion off said tube.

7. A waterproof construction, comprising:

a plurality of elongated transmitting members;

a tubular member through which said plurality of transmitting members pass;

a tube having a first end disposed away from said plurality of transmitting members and a second end disposed amongst and substantially coaxial with said plurality of transmitting members;

said second end of said tube having a plurality of holes; and aa sealant compound, injected into said first end of said tube to extrude from said plurality of holes in said second end of said tube, effective to fill gaps between said tube, said plurality of transmitting members, and said tubular member.

8. A waterproof construction according to claim 7, wherein said second end of said tube is attached to said plurality of transmitting members.

9. A waterproof construction according to claim 7, wherein said second end is disposed in the center of said plurality of transmitting members.

10. A waterproof construction, comprising:

a plurality of elongated transmitting members;

a flexible tubular member through which said plurality of transmitting members pass through;

a tube having a first end disposed outside said plurality of transmitting members and a second end attached to, and substantially at a center of, said plurality of transmitting members;

said second end of said tube having a plurality of holes; and a sealant compound, injected into said first end of said tube to extrude from said plurality of holes in said second end of said tube, effective to fill gaps between said tube, said plurality of transmitting members, and said tubular member.

11. A waterproof construction for a group of wires of a wiring harness adapted for insertion through a tubular member, comprising:

a tube which has a closed distal end portion and an open rear end and is formed, in the vicinity of said closed distal end portion with a number of pores;

said tube being disposed at a substantially central portion of the wires of the wiring harness; and a flowable sealing compound which is injected into said tube from said open rear end, said flowable sealing compound being extruded from said pores of said closed distal end portion so as to fill into gaps among the wires of the wiring harness;

wherein said distal end portion of said tube is attached to the wiring harness.

12. A waterproof construction, comprising:

a plurality of elongated transmitting members;

a tubular member through which said plurality of transmitting members pass;

a tube having a first end disposed away from said plurality of transmitting members and a second end disposed substantially coaxial with said plurality of transmitting members;

said second end of said tube having a plurality of holes; and a sealant compound, injected into said first end of said tube to extrude from said plurality of holes in said second end of said tube, effective to fill gaps between said tube, said plurality of transmitting members, and said tubular member;

wherein said second end of said tube is attached to said plurality of transmitting members.

* * * * *

UNITED STATES PATENT AND TRADEMARK OFFICE
CERTIFICATE OF CORRECTION

PATENT NO. : 5,635,678
DATED : June 3, 1997
INVENTOR(S) : Jun Yasukuni

It is certified that error appears in the above-indentified patent and that said Letters Patent is hereby corrected as shown below:

Column 6, line 60, (claim 4, line 13), change "disposed" to --dispose--.

Signed and Sealed this

Twenty-first Day of October 1997

Attest:

Attesting Officer

BRUCE LEHMAN

*Commissioner of Patents and Trademarks*